April 23, 1935.  I. M. LADDON ET AL  1,998,677
OPERATING MECHANISM
Filed May 9, 1927   3 Sheets-Sheet 1

INVENTORS
ISSAC M. LADDON
WILLIAM A. RING
FRED W. HERMAN
BY *Jn.W.McConkey*
ATTORNEY

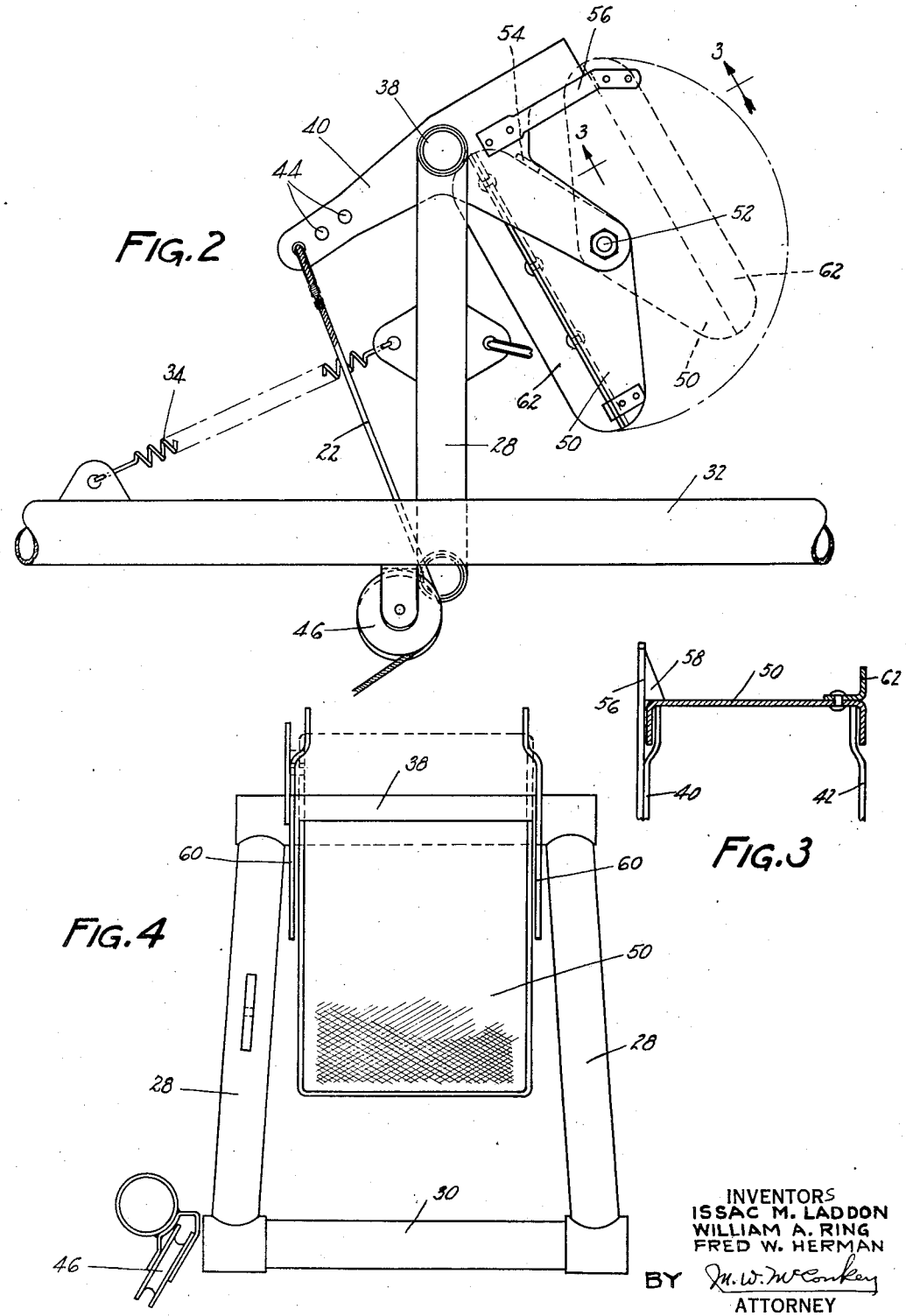

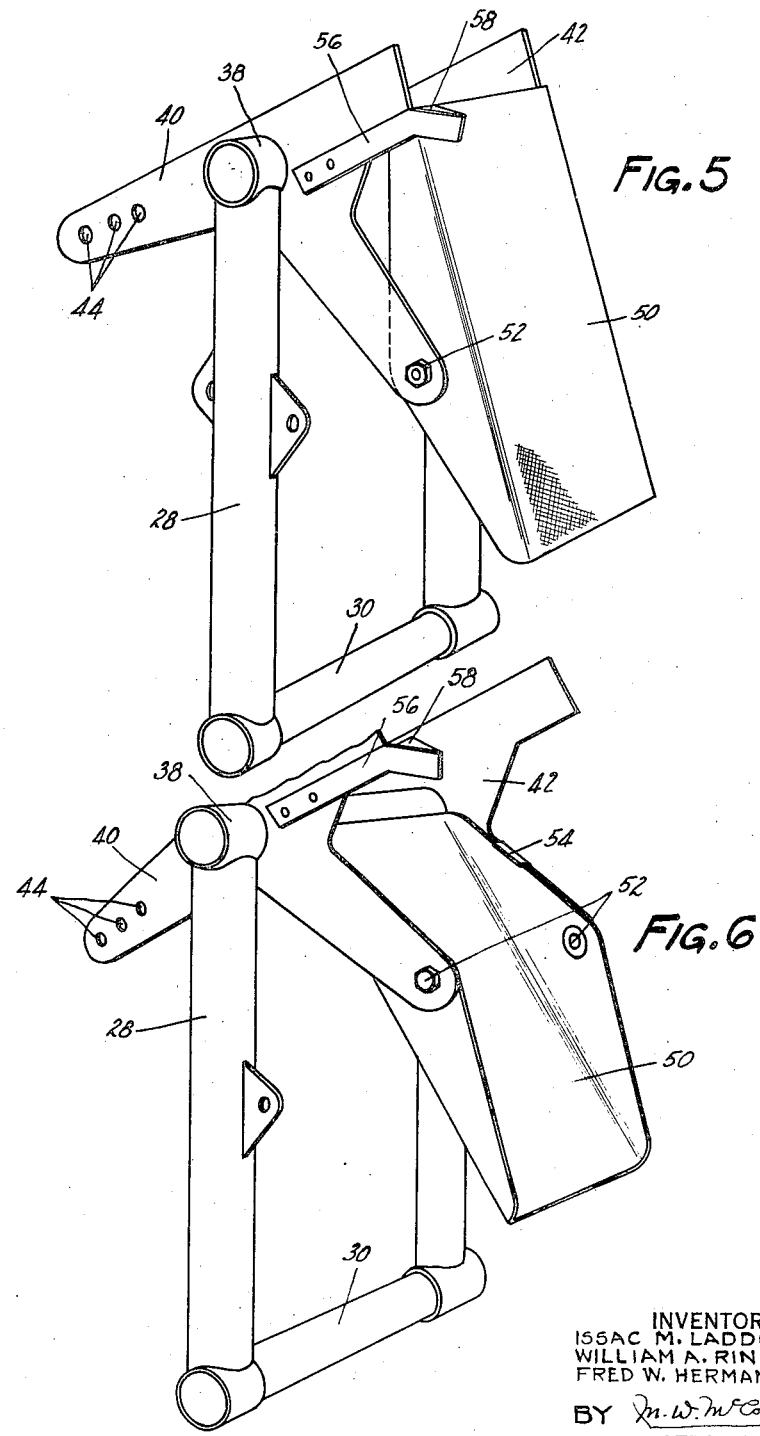

Patented Apr. 23, 1935

1,998,677

UNITED STATES PATENT OFFICE 1,998,677

OPERATING MECHANISM

Isaac M. Laddon, William A. Ring, and Fred W. Herman, Dayton, Ohio, assignors to Bendix Brake Company, Chicago, Ill., a corporation of Illinois Application May 9, 1927, Serial No. 189,767

6 Claims. (Cl. 244—29)

This invention relates to operating mechanism for controlling devices such as the steering and braking mechanism of an aeroplane. It is desirable, in controlling an aeroplane, that the control mechanism be arranged to operate the rudder for the purpose of steering while in the air and also be arranged to operate independently of each other the brakes on the wheels, for the purpose of steering when on the ground. The present invention has for an important object the interconnection of the means for operating the rudder or other steering device with the means for controlling the brakes on the wheels.

According to an important feature of the invention, there are a pair of control devices, preferably engageable by the pilot's feet, and there are connections from these devices for operating the rudder or its equivalent and auxiliary connections for operating the brakes. Preferably the rudder may be operated without affecting the brakes and the brakes may be operated without affecting the rudder, without necessitating removal of the pilot's feet from the controls.

In one desirable arrangement the two control devices are bodily movable for operating the rudder and pivotally movable for operating the brakes. Various features of novelty relate to the particular construction and arangement of the control devices themselves, independently of the novel combination of these devices with the rudder and brakes or equivalent controlling means, especially in the arrangement of the operating pedals to be reversed, or otherwise adjusted by the pilot's feet.

The above and other objects and features of the invention, including various novel and desirable details of construction, will be apparent from the following description of the illustrative embodiments shown in the accompanying drawings, in which:

Figure 2 is a side elevation of one of the control devices shown in Figure 1;

Figure 3 is a section through the pedal of Figure 2 when in its dotted line position;

Figure 4 is a rear elevation of the control shown in Figure 2, but with a slightly different form of catch for the pedal;

Figure 5 is a perspective view of the control shown in Figure 2, with the pedal shown in its upper position; and Figure 6 is a similar perspective with the pedal in its lower position.

Figure 1:
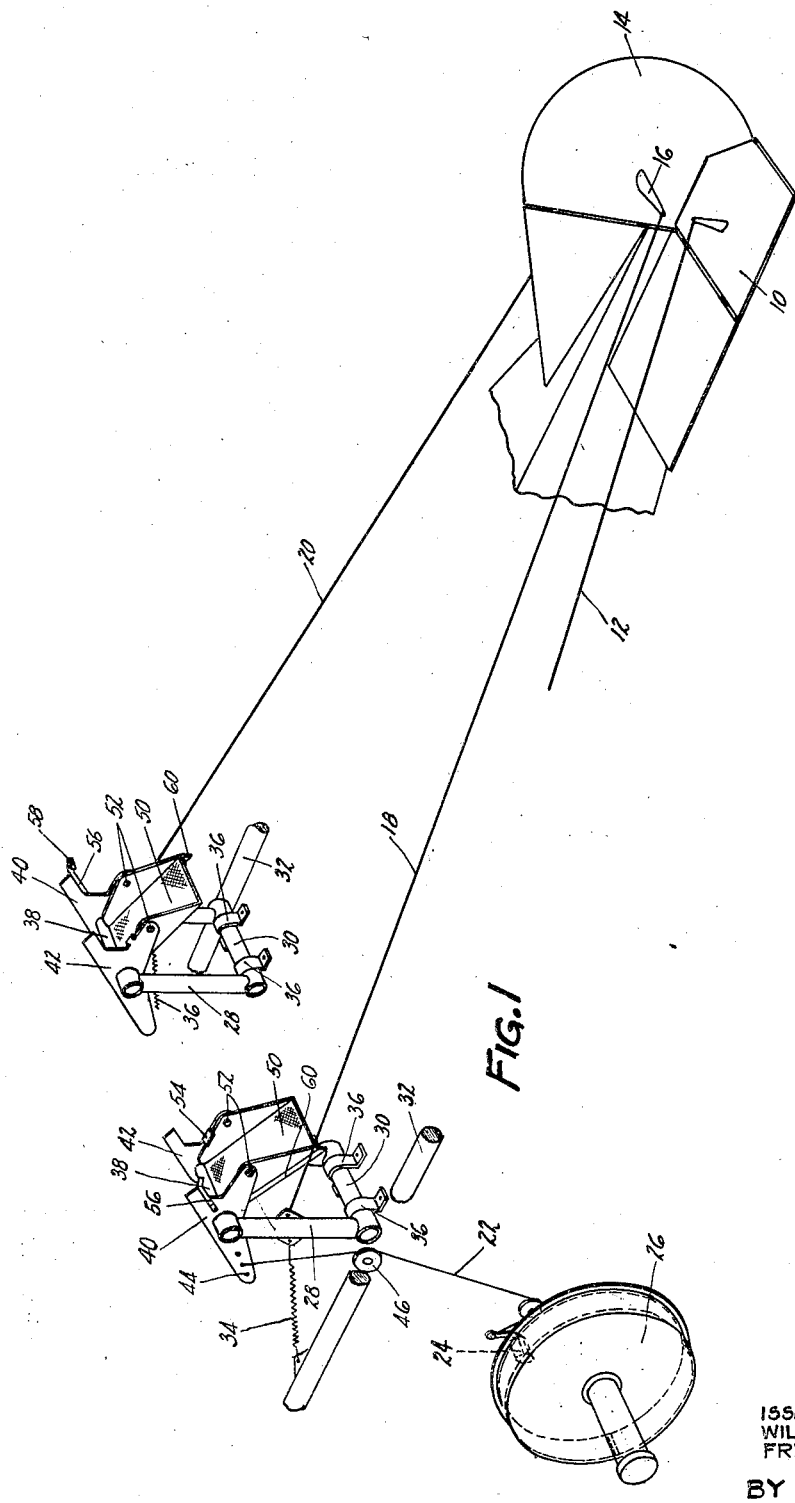
Figure 1 is a perspective view of the steering and braking mechanism of an aeroplane, the other parts of the aeroplane being omitted for clearness of illustration.

The aeroplane, as illustrated in Figure 1, may be provided with any suitable elevating rudder 10 operated by means 12 of any usual and desired character, and with a vertical steering rudder 14 having arms 16 projecting from its opposite sides and connected by means such as cables 18 and 20 with a pair of novel control devices shown in detail in Figures 2-6. Each of the control devices is also connected by means such as a cable 22 to the cam or other applying means 24 of a brake, the brake on the left wheel being shown diagrammatically at 26. It will be understood that there is a corresponding brake for the right wheel and that the two brakes can be operated independently of each other for the purpose of steering the aeroplane on the ground, while, of course, they can also be operated simultaneously for the purpose of retarding movement of the aeroplane when on the ground.

The control devices shown in Figures 1, 2, 3, 5, and 6 include frames or stands 28 having pivotally-mounted parts 30 mounted in clips or bearings fixed in any desired manner on the frame 32 of the aeroplane and to which the cables 18 and 20 are connected. Springs 34 and 36 connected to the respective control devices are normally balanced with these devices in their upright positions and with the rudder 14 or equivalent steering means in its central or neutral position.

The frames 28 are illustrated as each including a pair of spaced tubular uprights fixedly secured to the bearing member 30 which is pivotally held by bearings or straps 36 secured to any suitable fixed parts of the aeroplane (not shown), and connected at their upper ends by tubular members 38 on opposite sides of which are pivotally mounted bell-crank levers 40 and 42. Levers 40 are provided with a plurality of openings 44 for the attachment, with varying leverages, of the cable 22 of the corresponding brake. A pulley 46 opposite the end of the pivotally mounted pulley member 30 is arranged to serve as a guide for the cable 22, which thus passes immediately adjacent the axis about which the control device turns in moving the rudder 14 so that the operation of the rudder does not necessarily affect the brakes. Similarly, the brakes are operated by movement of the levers 40 and 42 about the axis of members 38 without necessarily affecting the rudder 14.

Levers 40 and 42 are operated to aprly the brakes, and the entire frame work 28 is operated to control the rudder 14, by novel pedals 50 pivotally mounted at 52 on the rear ends of the levers 40 and 42. These novel pedals 50 are reversible, so that they may be adjusted for the convenience of the pilot, for accommodating the control mechanism for use by tall or short pilots and also to permit varying the height of the control mechanism to rest the pilot by permitting him to assume different positions.

To secure the utmost convenience for these purposes, we consider it preferable that the pedals should be adjustable by merely swinging them about the pivot points 52 in such a manner that they may be manipulated by the pilot's feet. Accordingly, the pedals are of channel form so that when in the positions shown in Figures 1, 2, and 6, they will be further from the pilot's seat than when in the position shown in Figures 3, 4, and 5 and in dotted lines in Figure 2. When in the positions shown in Figure 6, the pedals are held by engagement with fixed lugs 54 on levers 42. When turned in a counter-clockwise direction in Figure 6 by the pilot's feet, each pedal 50 wedges its way past a spring catch 56 to the position shown in Figure 5, in which a tooth lug 58 snaps over the edge of the pedal to hold it in its adjusted position. In this position the upper end of the pedal engages the ends of projections on the levers 40 and 42 as shown in Figure 5. If preferred, a pair of spring lugs 60 may be provided on opposite sides of the pedal as shown in Figure 4.

If desired, an angular piece 62 may be riveted to the side of the pedal for engagement with the side of the pilot's foot, as shown in Figures 1, 2, and 3. Also, as is usual in some aeroplanes, the entire construction may be reversed to be mounted from above, instead of from the floor boards as shown.

It will be seen that the pilot can push forwardly on one of the pedals 50 at the same time that he lets up on the other, without turning the levers 40 and 42 with respect to the axis of member 38, thus moving the pedals bodily to effect movement of the rudder 14 or equivalent steering means without affecting the brakes. On the other hand, the pilot may exert pressure on one or the other of the pedals 50 in the direction of the axis of member 30, to rock the levers 40 and 42 about the axis of member 38, thus applying one or the other (or both) of the brakes without affecting the rudder 14. He may also reverse the pedals 50 at any time from the position shown in Figure 6 to that shown in Figure 5 by merely tipping them over with his feet, and, conversely, he may disengage the catches 56 by pushing sidewise with his feet and return the pedals from the position of Figure 5 to the position of Figure 6.

While a simple and desirable particular construction has been described in detail, it is not our intention to limit the scope of the invention to that particular construction or otherwise than by the terms of the appended claims.

We claim:

1. Control mechanism comprising, in combination, a rudder, a pair of separately pivoted operating frames connected to the rudder to move it in one direction or the other, brakes, a pair of control devices pivoted on the respective frames and movable bodily to cause pivotal movement of the frames to move the rudder, and connections to the brakes operated by pivotal movement of the control devices upon the frames.

2. Control mechanism comprising, in combination, a rudder, a pair of separately pivoted operating devices connected to the rudder to move it in one direction or the other, brakes, a pair of foot control pedals pivoted on the respective operating devices and movable bodily to cause pivotal movement of the operating devices to move the rudder, and connections to the brakes operated by pivotal movement of the pedals.

3. Control mechanism comprising, in combination, an operating means, a reversible pedal member pivoted on said means and of different heights in its reversed positions, a catch for holding the pedal member in one position, and a stop for holding the pedal member in its other position.

4. Control mechanism for an airplane comprising, in combination, a rudder for steering the airplane in the air, a pair of separately pivoted control devices, separate connections from each device to the rudder, said control devices being pivoted about axes extending substantially horizontally and substantially laterally of the airplane, whereby the rudder is controlled by substantially fore and aft movement of the control devices, a pair of independently operable brakes for steering the airplane on the ground, and a separate connection from each of the control devices to the corresponding one of the brakes.

5. In an airplane, the combination with a rudder operating mechanism including a member adapted to be engaged by the foot, of a wheel brake operating mechanism including a foot operated lever pivoted about said member and extending at an angle thereto.

6. In an airplane, the combination with a foot operated rudder operating mechanism including a pivotally mounted member for the left foot and a pivotally mounted member for the right foot, each member being adapted to be engaged by a foot of the operator, of a wheel brake operating mechanism including a foot operated lever pivotally mounted about one member adjacent the foot position thereon and a foot operated lever pivotally mounted about the other member adjacent the foot position on the latter, and independent means connecting one of said levers to one wheel brake and the other of said levers to another wheel brake.

ISAAC M. LADDON.
WILLIAM A. RING.
FRED W. HERMAN.